United States Patent
Bodiya et al.

(10) Patent No.: US 11,526,012 B2
(45) Date of Patent: Dec. 13, 2022

(54) DISPLAYS AND METHODS OF OPERATING THEREOF

(71) Applicant: GOOGLE LLC, Mountain View, CA (US)

(72) Inventors: Timothy Paul Bodiya, Toronto (CA); Shreyas Potnis, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 412 days.

(21) Appl. No.: 16/738,056

(22) Filed: Jan. 9, 2020

(65) Prior Publication Data

US 2020/0225480 A1  Jul. 16, 2020

Related U.S. Application Data

(60) Provisional application No. 62/910,124, filed on Oct. 3, 2019, provisional application No. 62/791,514, filed on Jan. 11, 2019.

(51) Int. Cl.
*G02B 27/01* (2006.01)
*G02B 27/09* (2006.01)
*F21V 8/00* (2006.01)

(52) U.S. Cl.
CPC ....... *G02B 27/0172* (2013.01); *G02B 6/0031* (2013.01); *G02B 27/0916* (2013.01); *G02B 2027/0112* (2013.01); *G02B 2027/0174* (2013.01); *G02B 2027/0178* (2013.01)

(58) Field of Classification Search
CPC ............ G02B 27/0172; G02B 27/0179; G02B 2027/0178; G02B 6/0031; G02B 27/0916; G02B 2027/0112; G02B 2027/0174; G02B 5/30; G02B 6/0026
See application file for complete search history.

(56) References Cited

U.S. PATENT DOCUMENTS

| | | | |
|---|---|---|---|
| 2010/0142015 A1* | 6/2010 | Kuwahara | G03F 7/001 359/3 |
| 2012/0243102 A1* | 9/2012 | Takeda | G02B 6/003 359/630 |
| 2020/0050034 A1* | 2/2020 | Ziemkiewicz | G02F 1/1326 |
| 2020/0225481 A1* | 7/2020 | Bodiya | H04N 9/3155 |

* cited by examiner

*Primary Examiner* — Jade R Chwasz

(57) ABSTRACT

There is provided a method of operating a wearable heads-up display, which display includes a light source, a light guide, and an incoupler carried by the light guide. The method includes emitting first and second beams having first and second wavelengths respectively, directing the first and second beams towards the incoupler, and directing, by the incoupler, at least a portion of the first and second beams into the light guide. Moreover the method includes internally reflecting, by the light guide, the portions of the first and second beams to form first and second reflected beams respectively. The first and second beams respectively may have first and second incoupling losses. Furthermore, the method includes adjusting a beam characteristic of at least one of the first and second beams to control a difference between their respective incoupling losses.

19 Claims, 9 Drawing Sheets

100

Emitting, by a light source of a wearable heads-up display (WHUD), a first beam having a first wavelength and a second beam having a second wavelength

105

Directing, by a relay optic, the first beam and the second beam towards an incoupler of the WHUD

110

Directing, by the incoupler, at least a portion of the first beam and at least a portion of the second beam into a light guide of the WHUD, the incoupler carried by the light guide

115

Internally reflecting, by the light guide, the portion of the first beam and the portion of the second beam to form a first reflected beam and a second reflected beam respectively, the first reflected beam incident upon a reflective surface of at least one of the incoupler and the light guide at a first bounce position and the second reflected beam incident upon the reflective surface of at least one of the incoupler and the light guide at a second bounce position, the first beam having a first incoupling loss based on the first bounce position and the second beam having a second incoupling loss based on the second bounce position

120

Adjusting a beam characteristic of at least one of the first beam and the second beam to control a difference between the first incoupling loss and the second incoupling loss

DISPLAYS AND METHODS OF OPERATING THEREOF

CROSS REFERENCE TO RELATED APPLICATION

This application claims the benefit of U.S. Provisional Application No. 62/910,124, filed 3 Oct. 2019, titled "DISPLAYS AND METHODS OF OPERATING THEREOF" and U.S. Provisional Application No. 62/791,514, filed 11 Jan. 2019, titled "Systems, Devices, and Methods for Light Guide Based Wearable Heads-Up Displays", the content of both of which are incorporated herein in their entirety by reference.

FIELD

The present specification relates to displays and methods of operating thereof, and in particular to wearable head-us displays and methods of operating thereof.

BACKGROUND

Displays may be used to form still or moving images. Some displays may use a display panel to form images. Examples of such display panels include Light Emitting Diode (LED) display panels, Liquid Crystal Display (LCD) panels, and the like. In addition, some displays may use projectors to project still or moving images. Small displays may be used to form, or as a part of, mobile or wearable devices. For example, some displays may form or be part of a wearable heads-up display.

SUMMARY

According to an implementation of the present specification there is provided a method of operating a wearable heads-up display ("WHUD"), wherein the WHUD comprises a light source, a light guide, and an incoupler carried by the light guide, the method comprising: emitting, by the light source, a first beam having a first wavelength and a second beam having a second wavelength; directing, by a relay optic, the first beam and the second beam towards the incoupler; directing, by the incoupler, at least a portion of the first beam and at least a portion of the second beam into the light guide; internally reflecting, by the light guide, the portion of the first beam and the portion of the second beam to form a first reflected beam and a second reflected beam respectively, the first reflected beam incident upon a reflective surface of at least one of the incoupler and the light guide at a first bounce position and the second reflected beam incident upon the reflective surface of at least one of the incoupler and the light guide at a second bounce position, the first beam having a first incoupling loss based on the first bounce position and the second beam having a second incoupling loss based on the second bounce position; and adjusting a beam characteristic of at least one of the first beam and the second beam to control a difference between the first incoupling loss and the second incoupling loss.

The beam characteristic may comprise a beam width; and the adjusting the beam characteristic may comprise adjusting the beam width of at least one of the first beam and the second beam.

The adjusting the beam width of at least one of the first beam and the second beam may comprise adjusting the beam width of at least one of the first beam and the second beam to set a first ratio of the beam width of the first beam to a beam width of the second beam to be about equal to a second ratio of the first wavelength to the second wavelength.

The first beam and the second beam may be incident upon the reflective surface of the incoupler at a first incidence position and a second incidence position respectively; the reflective surface of the incoupler may have an edge disposed between the first incidence position and the first bounce position; and the adjusting the beam characteristic may comprise adjusting at least one of the first incidence position and the second incidence position relative to the edge.

A first given incidence position may be one of the first incidence position and the second incidence position corresponding to a shorter one of the first wavelength and the second wavelength; a second given incidence position may be another one of the first incidence position and the second incidence position corresponding to a longer one of the first wavelength and the second wavelength; and the adjusting at least one of the first incidence position and the second incidence position relative to the edge may comprise adjusting at least one of the first incidence position and the second incidence position to position the first given incidence position to be closer to the edge than the second given incidence position is to the edge.

The adjusting at least one of the first incidence position and the second incidence position relative to the edge may comprise adjusting at least one of the first incidence position and the second incidence position relative to the edge to set a first ratio of a first distance of the first incidence position from the edge to a second distance of the second incidence position from the edge to be about equal to a second ratio of the first wavelength to the second wavelength.

The directing the first beam and the second beam towards the incoupler may comprise directing the first beam and the second beam towards the incoupler comprising a surface relief grating.

The method may further comprise: obtaining a field position comprising spatial coordinates of a pixel of an image to be formed using the first beam and the second beam; and adjusting the beam characteristic of at least one of the first beam and the second beam based on the field position, the adjusting the beam characteristic to reduce an intensity non-uniformity in the image, the intensity non-uniformity caused by changes in the first incoupling loss and the second incoupling loss as a function of the field position.

The adjusting the beam characteristic of at least one of the first beam and the second beam based on the field position may comprise adjusting an intensity of at least one of the first beam and the second beam based on the field position.

The adjusting the beam characteristic of at least one of the first beam and the second beam based on the field position may comprise adjusting a beam width of at least one of the first beam and the second beam based on the field position.

The adjusting the beam characteristic of at least one of the first beam and the second beam based on the field position may comprise adjusting a polarization of at least one of the first beam and the second beam based on the field position.

The first incoupling loss may comprise a first lost portion of the first beam that is incident upon the incoupler and directed into the light guide, the first lost portion then directed out of the light guide by the incoupler; and the second incoupling loss may comprise a second lost portion of the second beam that is incident upon the incoupler and directed into the light guide, the second portion then directed out of the light guide by the incoupler.

The first incoupling loss may be higher if a first location of the first bounce position is within the incoupler and lower if the first location of the first bounce position is within the light guide; and the second incoupling loss may be higher if a second location of the second bounce position is within the incoupler and lower if the second location of the second bounce position is within the light guide.

According to another implementation of the present specification there is provided a wearable heads-up display (WHUD) comprising: a light source to generate an output light comprising a first beam having a first wavelength and a second beam having a second wavelength; a relay optic to receive the output light from the light source; a light guide; an incoupler carried by the light guide, the incoupler to receive the output light from the relay optic and direct at least a portion of the first beam and at least a portion of the second beam into the light guide, the light guide to internally reflect the portion of the first beam and the portion of the second beam to form a first reflected beam and a second reflected beam respectively, the first reflected beam incident upon a reflective surface of at least one of the incoupler and the light guide at a first bounce position and the second reflected beam incident upon the reflective surface of at least one of the incoupler and the light guide at a second bounce position, the first beam having a first incoupling loss based on the first bounce position and the second beam having a second incoupling loss based on the second bounce position; an outcoupler carried by the light guide, the outcoupler to direct at least a portion of the first reflected beam and at least a portion of the second reflected beam out of the light guide towards an eye of a user wearing the WHUD; and a controller in communication with the light source and the relay optic, the controller to: control the light source to emit the output light; and control at least one of the light source and the relay optic to adjust a beam characteristic of at least one of the first beam and the second beam to control a difference between the first incoupling loss and the second incoupling loss.

The beam characteristic may comprise a beam width; and to adjust the beam characteristic the controller may be to control at least one of the light source and the relay optic to adjust the beam width of at least one of the first beam and the second beam.

To adjust the beam width of at least one of the first beam and the second beam the controller may be to control at last one of the light source and relay optic to adjust the beam width of at least one of the first beam and the second beam to set a first ratio of the beam width of the first beam to a beam width of the second beam to be about equal to a second ratio of the first wavelength to the second wavelength.

The first beam and the second beam may be incident upon the reflective surface of the incoupler at a first incidence position and a second incidence position respectively; the reflective surface of the incoupler may have an edge disposed between the first incidence position and the first bounce position; and to adjust the beam characteristic the controller may be to control at least one of the light source and the relay optic to adjust at least one of the first incidence position and the second incidence position relative to the edge.

A first given incidence position may be one of the first incidence position and the second incidence position corresponding to a shorter one of the first wavelength and the second wavelength; a second given incidence position may be another one of the first incidence position and the second incidence position corresponding to a longer one of the first wavelength and the second wavelength; and to adjust at least one of the first incidence position and the second incidence position relative to the edge the controller may be to control at least one of the light source and the relay optic to adjust at least one of the first incidence position and the second incidence position to position the first given incidence position to be closer to the edge than the second given incidence position is to the edge.

To adjust at least one of the first incidence position and the second incidence position relative to the edge the controller may be to control at least one of the light source and the relay optic to adjust at least one of the first incidence position and the second incidence position relative to the edge to set a first ratio of a first distance of the first incidence position from the edge to a second distance of the second incidence position from the edge to be about equal to a second ratio of the first wavelength to the second wavelength.

The incoupler may comprise a surface relief grating.

The controller may be further to: obtain a field position comprising spatial coordinates of a pixel of an image to be formed using the first beam and the second beam; and control at least one of the light source and the relay optic to adjust the beam characteristic of at least one of the first beam and the second beam based on the field position, the controller to adjust the beam characteristic to reduce an intensity non-uniformity in the image, the intensity non-uniformity caused by changes in the first incoupling loss and the second incoupling loss as a function of the field position.

To adjust the beam characteristic of at least one of the first beam and the second beam based on the field position the controller may be to control at least one of the light source and the relay optic to adjust an intensity of at least one of the first beam and the second beam based on the field position.

To adjust the beam characteristic of at least one of the first beam and the second beam based on the field position the controller may be to control at least one of the light source and the relay optic to adjust a beam width of at least one of the first beam and the second beam based on the field position.

To adjust the beam characteristic of at least one of the first beam and the second beam based on the field position the controller may be to control at least one of the light source and the relay optic to adjust a polarization of at least one of the first beam and the second beam based on the field position.

The first incoupling loss may comprise a first lost portion of the first beam that is incident upon the incoupler and directed into the light guide, the first lost portion then directed out of the light guide by the incoupler; and the second incoupling loss may comprise a second lost portion of the second beam that is incident upon the incoupler and directed into the light guide, the second portion then directed out of the light guide by the incoupler.

The first incoupling loss may be higher if a first location of the first bounce position is within the incoupler and lower if the first location of the first bounce position is within the light guide; and the second incoupling loss may be higher if a second location of the second bounce position is within the incoupler and lower if the second location of the second bounce position is within the light guide.

The relay optic may comprise a spatial modulator.

The relay optic may further comprise at least one passive optical element to adjust the beam characteristic.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 1 shows a flowchart of an example method of operating a wearable heads-up display, in accordance with a non-limiting implementation of the present specification.

DETAILED DESCRIPTION

Figure 2:
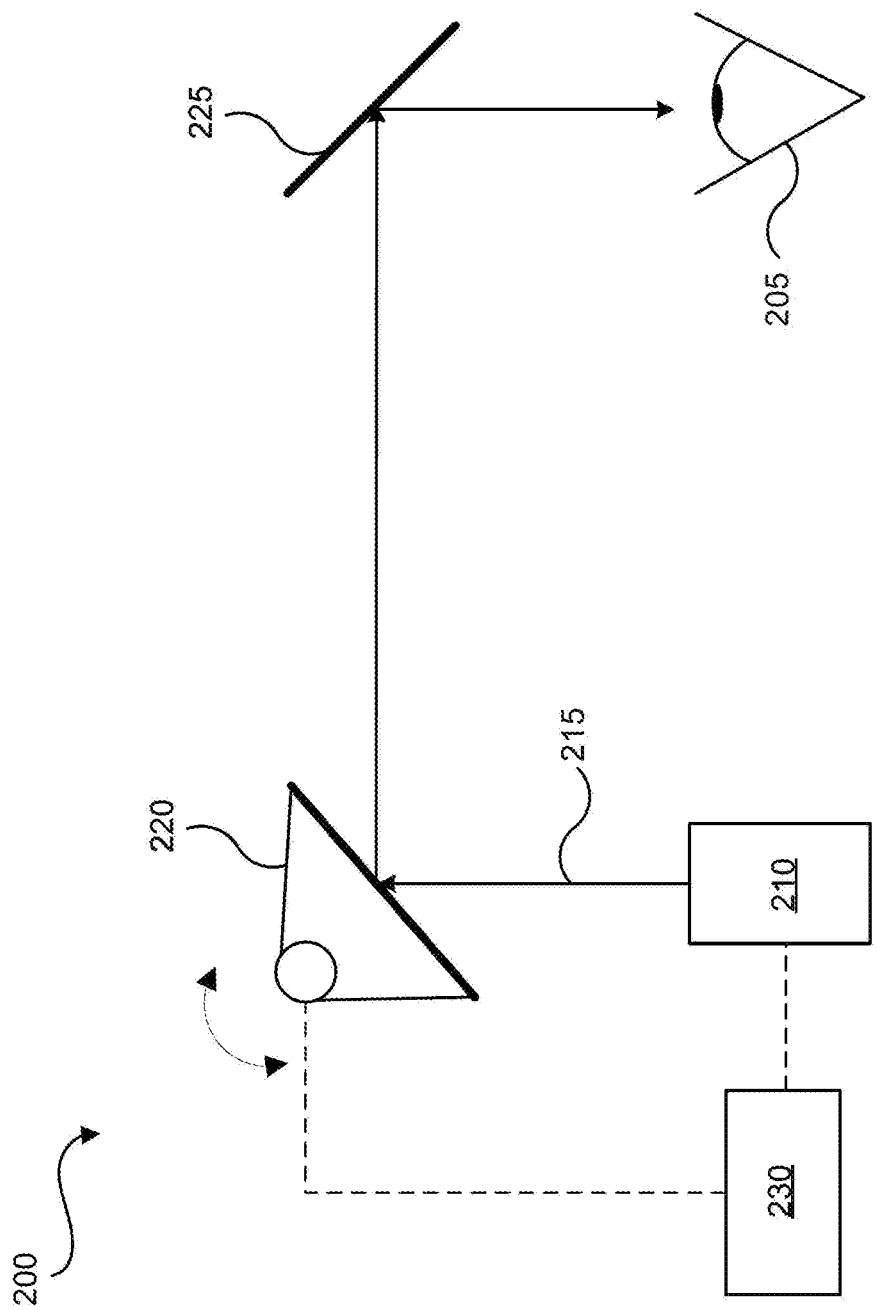
FIG. 2 shows a schematic representation of an example system which may be used to form or project an image, in accordance with a non-limiting implementation of the present specification.

In the following description, certain specific details are set forth in order to provide a thorough understanding of various disclosed implementations. However, one skilled in the relevant art will recognize that implementations may be practiced without one or more of these specific details, or with other methods, components, materials, and the like. In other instances, well-known structures associated with light sources have not been shown or described in detail to avoid unnecessarily obscuring descriptions of the implementations.

Unless the context requires otherwise, throughout the specification and claims which follow, the word "comprise" and variations thereof, such as, "comprises" and "comprising" are to be construed in an open, inclusive sense, that is as "including, but not limited to."

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations.

Throughout this specification and the appended claims, the term "carries" and variants such as "carried by" are generally used to refer to a physical coupling between two objects. The physical coupling may be direct physical coupling (i.e. with direct physical contact between the two objects) or indirect physical coupling that may be mediated by one or more additional objects. Thus, the term carries and variants such as "carried by" are meant to generally encompass all manner of direct and indirect physical coupling, including without limitation: carried on, carried within, physically coupled to, secured to, and/or supported by, with or without any number of intermediary physical objects therebetween.

Displays may use optical elements to guide and manipulate light to form images. Such optical elements may cause non-uniformities in the displayed images. Some of these non-uniformities may include variations in intensity or color balance across the field of the image. The field may comprise the array of pixels that form the image. Some of these non-uniformities may be detectable by a viewer of the display. The viewer of the display may also be described as the user of the display. FIG. 1 shows a flowchart of an example method 100 of operating a wearable heads-up display (WHUD). Method 100 may be used to reduce intensity or color balance non-uniformities of the images formed by the WHUD.

In some examples, the WHUD may comprise a light source, a relay optic, and a display optic. Moreover, in some examples, the relay optic may comprise an active optical element such as a spatial modulator, and the like. Furthermore, in some examples the relay optic may comprise a passive optical element such a lens, a reflector, a filter, and the like. The display optic, in turn, may comprise the optical elements used to guide or manipulate light. In some examples, the display optic may comprise a light guide and an incoupler carried by the light guide. Example displays and WHUDs, and their relay and display optics, are described in greater detail in relation to FIGS. 2-4.

Turning now to method 100, at box 105 a first beam having a first wavelength and a second beam having a second wavelength may be emitted by the light source. In some examples, the light source may also emit additional beams having corresponding wavelengths. For example, the light source may emit three beams having wavelengths in the red, green, and blue wavelength ranges.

At box 110, the first beam and the second beam may be directed towards the incoupler by the relay optic. An example incoupler and light guide are described in greater detail in relation to FIG. 4. At box 115, at least a portion of the first beam and at least a portion of the second beam may be directed into the light guide by the incoupler. In some examples, the incoupler may redirect the portion of the first and second beams in a direction that allows these portions to propagate into the light guide.

Furthermore, at box 120, the portion of the first beam and the portion of the second beam may be internally reflected by the light guide to form a first reflected beam and a second reflected beam respectively. The first reflected beam may be incident upon a reflective surface of at least one of the incoupler and the light guide at a first bounce position, and the second reflected beam may be incident upon the reflective surface of at least one of the incoupler and the light guide at a second bounce position. In other words, "bounce position" may describe the position where the reflected portions of the first and second beams become incident upon the reflective surfaces of either the light guide or the incoupler.

In some examples, at least some internal surfaces of the light guide may reflect at least some of the beams of light propagating in the light guide due to total internal reflection, or other reflection mechanisms, to retain the beams within the light guide. As such, these internal surfaces of the light guide may be described as reflective surfaces. Furthermore, the incoupler may also have one or more surfaces to reflect or otherwise redirect light. A portion or surface of the incoupler that is capable of interacting with and redirecting light may be described as a "reflective surface" of the incoupler. In some examples, the incoupler may comprise a surface relief grating (SRG), a hologram, and the like.

It is contemplated that in examples where the incoupler comprises a hologram, "reflective surface" may refer to a region or volume of the hologram which may interact with and redirect the light beams incident upon it. Moreover, in some examples, "reflective surface" in relation to the incoupler may refer to those surfaces or portions of the incoupler which may outcouple out of the light guide reflected beams which are propagating in the light guide and become incident on the those surfaces or portions of the incoupler.

The first and second reflected beams may have their respective first and second bounce positions on the reflective surface of the light guide or the reflective surface of the incoupler. It is also contemplated that in some examples the bounce position may be partly on the reflective surface of the light guide and partly on the reflective surface of the incoupler. In other words, at a bounce position, the cross-section or the footprint of the corresponding reflected beam may be on the reflective surface of the light guide, on the reflective surface of the incoupler, or partly on the reflective surface of the light guide and partly on the reflective surface of the incoupler.

The first beam may in turn have a first incoupling loss based on the first bounce position, and the second beam may have a second incoupling loss based on the second bounce position. In some examples, the larger is the portion of the footprint of the reflected beam that is on the reflective surface of the incoupler at the bounce position, the larger may be the incoupling loss of the associated beam. The relationship between the bounce position relative to the incoupler and incoupling losses is described in greater detail in relation to FIGS. 6-8.

At box 125 of method 100 a beam characteristic of at least one of the first beam and the second beam may be adjusted to control a difference between the first incoupling loss and the second incoupling loss. In some examples, the beam characteristic may comprise a beam width, an incidence position of the beam on the incoupler, a polarization of the beam, an intensity of the beam, and the like. In some examples, adjusting the beam characteristic may be used to reduce wavelength-dependent or other incoupling losses, thereby reducing intensity or color balance non-uniformities in the image formed using those beams. Moreover, while method 100 is described in relation to two beams having corresponding first and second wavelengths, it is contemplated that in some examples method 100 may be applied to three or more beams, with corresponding wavelengths, to reduce the differences between their respective incoupling losses.

Turning now to FIG. 2, a schematic representation of an example system 200 is shown. System 200 may be used to form or project an image viewable by an eye 205 of a viewer. System 200 may also be referred to or described as an image projection device, a display device, a display system, or a display. System 200 may comprise a light source 210 to generate an output light 215. In some examples, system 200 may be used to implement method 100 and the other methods described herein. Light source 210 may comprise a laser, a light emitting diode, and the like. System 200 may also comprise a spatial modulator 220 to receive output light 215 from light source 210. In some examples, spatial modulator 220 may comprise a movable reflector, a micro-electro-mechanical system (MEMS), a digital micromirror device (DMD), and the like. In some examples, spatial modulator 220 may be part of a relay optic of system 200.

Furthermore, system 200 may comprise a display optic 225 to receive output light 215 from spatial modulator 220 and direct the output light towards eye 205 of a viewer. In some examples, display optic 225 may comprise an optical combiner such as a holographic optical element (HOE), and the like. Moreover, in some examples, display optic 225 may comprise an optical incoupler, a waveguide, and an optical outcoupler, as described in greater detail in relation to FIG. 4. Moreover, in some examples system 200 may be a part of or incorporated into a wearable heads-up display (WHUD). Such a heads-up display may have different designs or form factors, such as the form factor of eyeglasses, as is described in greater detail in relation to FIG. 3. In examples where system 200 is in the form factor of glasses, display optic 225 may be on or in a lens of the glasses.

In addition, system 200 comprises a controller 230 in communication with light source 210 and spatial modulator 220. Controller 230 may control light source 210 and spatial modulator 220 to project an image. In some examples, the image to be projected may be a still image, a moving image or video, an interactive image, a graphical user interface, and the like.

In some examples, the controllers described herein such as controller 230 may comprise a processor in communication with a non-transitory processor-readable medium. The processor-readable medium may comprise instructions to cause the processors to control the light source and the spatial modulator as described in relation to the methods and systems described herein. Moreover, in some examples the controllers may be free-standing components, while in other examples the controllers may comprise functional modules incorporated into other components of their respective systems.

Furthermore, in some examples the controllers or their functionality may be implemented in other ways, including: via Application Specific Integrated Circuits (ASICs), in standard integrated circuits, as one or more computer programs executed by one or more computers (e.g., as one or more programs running on one or more computer systems), as one or more programs executed by on one or more controllers (e.g., microcontrollers), as one or more programs executed by one or more processors (e.g., microprocessors, central processing units, graphical processing units), as firmware, and the like, or as a combination thereof.

Figure 3:
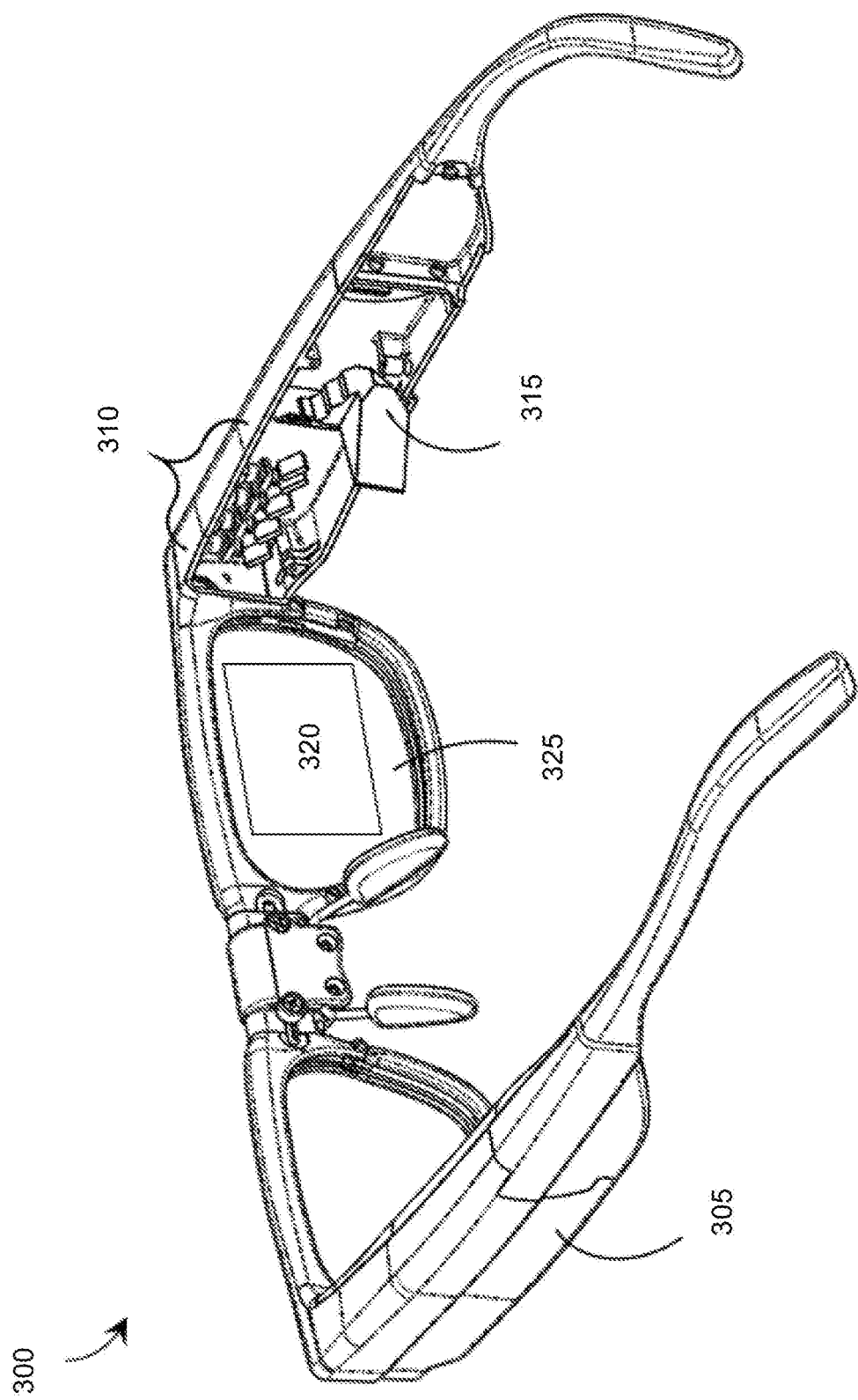
FIG. 3 shows a partial-cutaway perspective view of an example wearable heads-up display, in accordance with a non-limiting implementation of the present specification.

Turning now to FIG. 3, a partial-cutaway perspective view of an example wearable heads-up display (WHUD) 300 is shown. WHUD 300 includes a support structure 305 that in use is worn on the head of a user and has the general form factor and appearance of an eyeglasses (e.g. sunglasses) frame. Eyeglasses or sunglasses may also be generically referred to as "glasses". Support structure 305 may carry components of a system to display an image, such as system 200. For example, the light source module may be received in a space 310 in a side arm of support structure 305. In other examples, one or more of the image projection and output light adjustment system components or systems described herein may be received in or carried by support structure 305.

The spatial modulator of the systems described herein may be received in or be part of component 315 of support structure 305. The spatial modulator in turn may direct the output light onto a display optic 320 carried by a lens 325 of support structure 305. In some examples, display optic 320 may be similar in structure or function to display optic 225. Moreover, in some examples display optic 320 may comprise an optical incoupler, a waveguide, and an optical outcoupler, as described in greater detail in relation to FIG. 4.

Figure 4:
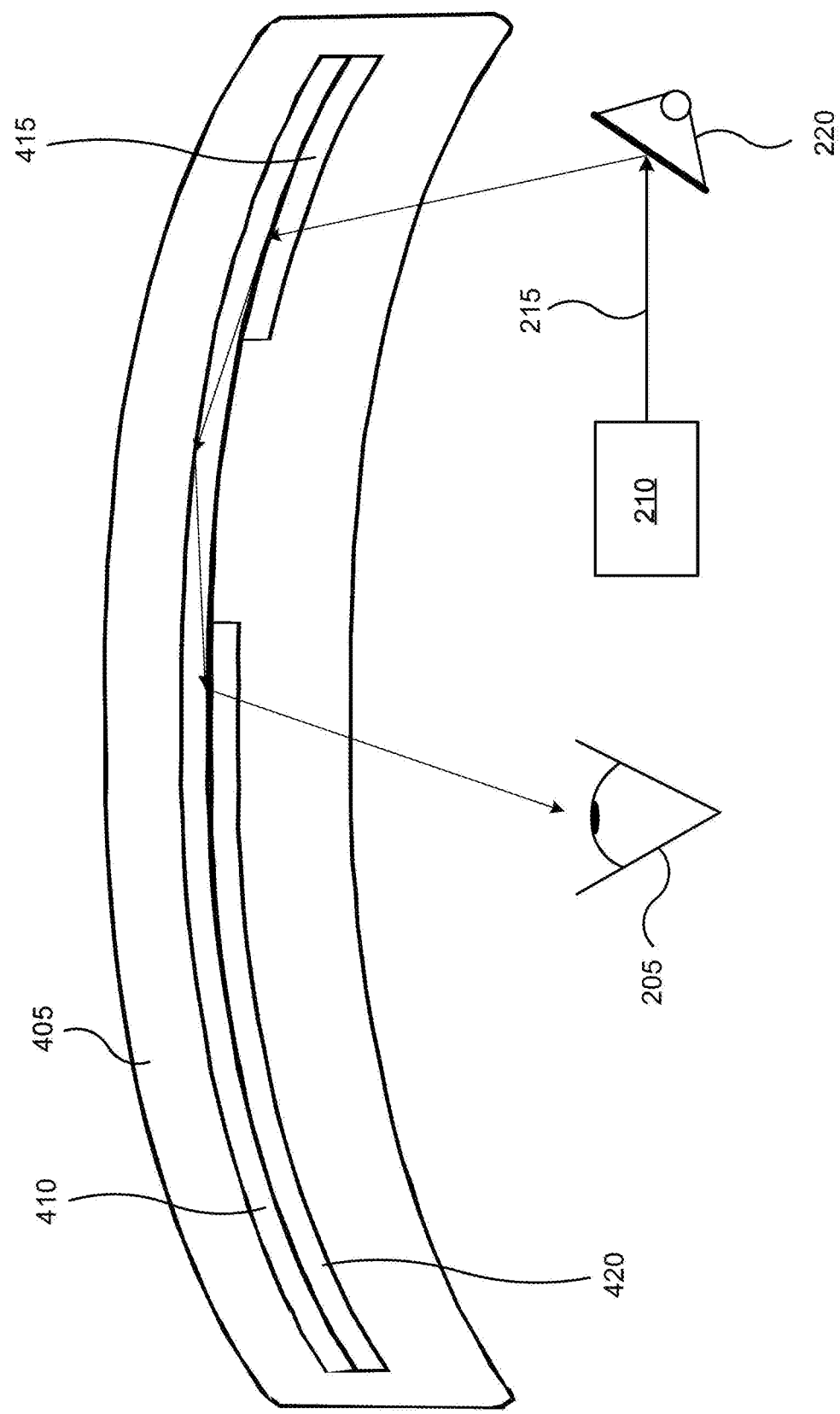
FIG. 4 shows a schematic cross-sectional representation of an example lens of an example wearable heads-up display, in accordance with a non-limiting implementation of the present specification.

Turning now to FIG. 4, a schematic cross-sectional representation is shown of an example lens 405 of an example WHUD. The components in FIG. 4 are not cross-hatched to allow for a clearer illustration of the path of an example ray of light traversing these components. In some examples, lens 405 may be used as lens 325 in WHUD 300. Lens 405 has embedded within it a display optic.

The display optic comprises a light guide 410, and an optical incoupler 415 and an optical outcoupler 420 both carried upon light guide 410. It is contemplated that in some examples, this display optic may be used as display optic 225 in system 200. In some examples, light guide 410 may guide light within it using total internal reflection. Incoupler 415 may receive an incoming beam of light, such as output light 215 generated by light source 210. Incoupler 415 may then redirect output light 215 towards light guide 410 at an angle that allows output light 215 to enter light guide 410, and to travel through light guide 410. Total internal reflection may prevent output light 215 from leaking from the walls of light guide 410.

Once output light 215 that is travelling in light guide 410 reaches and becomes incident upon outcoupler 420, outcoupler 420 may direct output light 215 out of light guide 410 and towards eye 205 of a user. In some examples, incoupler 415 and outcoupler 420 may comprise surface relief gratings (SRGs), holograms, and the like. Moreover, while FIG. 4 shows incoupler 415 and outcoupler 420 as being components carried on an outer surface of light guide 410, it is contemplated that in some examples the incoupler or the outcoupler may comprise surface features such as SRGs on the light guide itself. In other words, in some examples the incoupler or the outcoupler may be optical features or elements incorporated within or on the surface of the light guide itself.

Furthermore, it is contemplated that in some examples the incoupler may be incorporated within or on an inner surface of the light guide, such that the incoming output light passes through at least a portion of the light guide before impinging on the incoupler. In some examples, the combination of light guide 410, incoupler 415, and outcoupler 420 may be described as a display optic. Such a display optic may be used as display optic 225 in system 200 or display optic 320 in WHUD 300.

Figure 5:
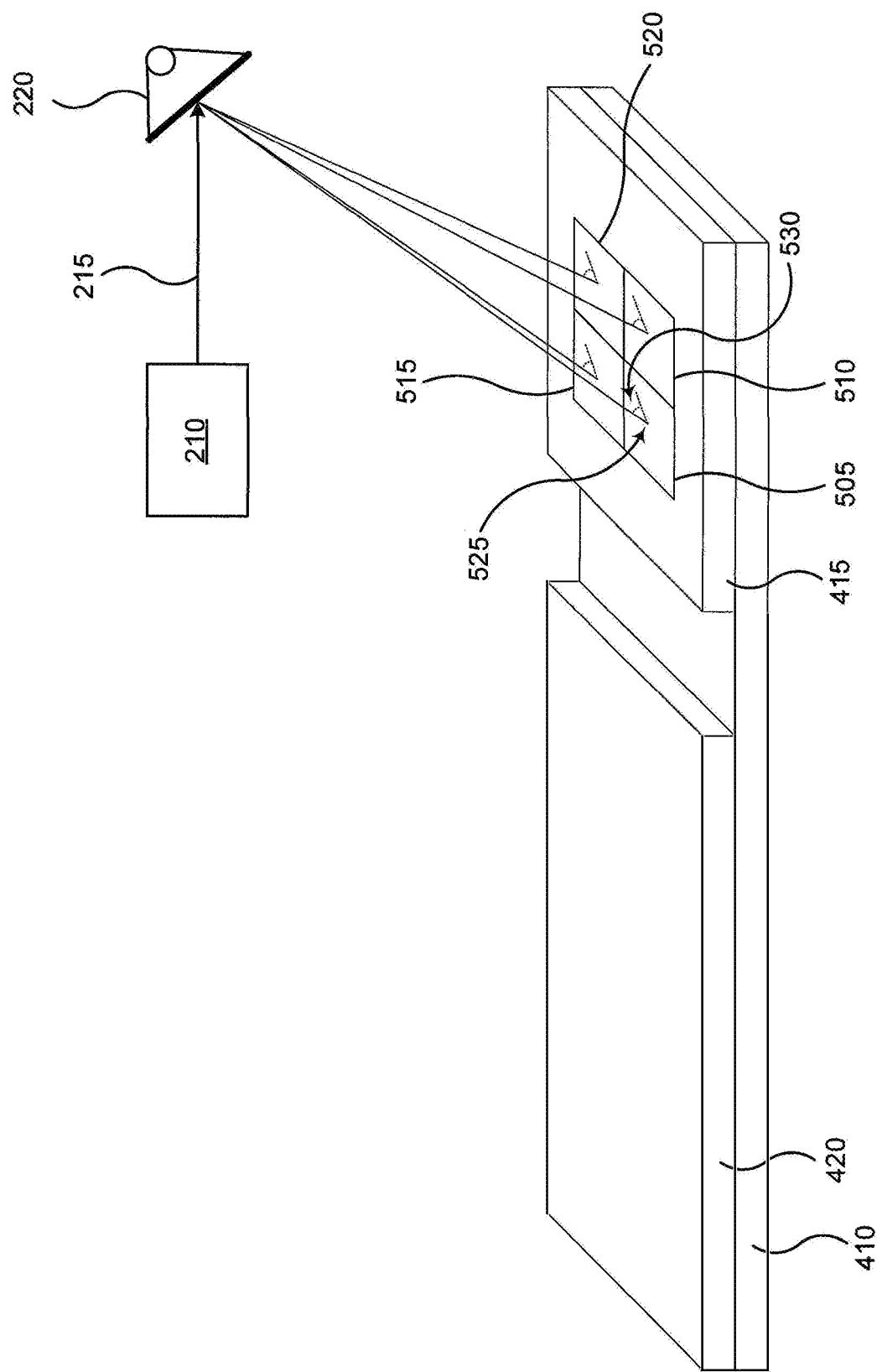
FIG. 5 shows a schematic representation of the display optic shown in FIG. 4.

In some examples, there may be variations in the optical path of the light beam through the display optic for different pixels of the image being formed. These variations may cause non-uniformities across the field of the image. FIG. 5 shows a schematic representation of the display optic shown in FIG. 4. FIG. 5 shows four pixels 505, 510, 515, and 520 projected by spatial modulator 220 on incoupler 415. While FIG. 5 shows for simplicity of illustration four pixels forming a 2×2 image field, it is contemplated that in some examples the field may have a different number of pixels. Moreover, the light guide, incoupler, and outcoupler which are shown as being curved in the cross-section in FIG. 4 are shown without said curvature (i.e. as being planar) in FIG. 5, for ease of illustration.

In addition, while FIG. 5 shows four beams extending from spatial modulator 220 to incoupler 415, it is contemplated that in display systems where the projector comprises a scanning projector, one beam may be rastered across the incoupler, or that the four beams may be projected sequentially.

FIG. 5 shows that the beam for each of the pixels may have an incidence position and an incidence angle on the incoupler, which may be different than the incidence positions and angles for the other pixels. For example, the beam to form pixel 505 may have an incidence position 525 and an incidence angle 530 relative to incoupler 415, which may be different than the corresponding incidence positions and angles for pixels 510, 515, and 520. This pixel-dependent or field position-dependent variation in incidence positions and angels may cause the beam that is used to form the image to traverse a different optical path in the display optic for the different pixels of the image.

In addition, the differences in the incidence position of the beam on incoupler 415 may translate to correspondingly different bounce positions for the reflected beam for the different pixels across the field. The different bounce positions, in turn, may cause differences in the incoupling losses for the different pixels across the field of the image. Moreover, the differences in incoupling losses may translate to intensity or color balance non-uniformities across the field of the image.

Figure 6:
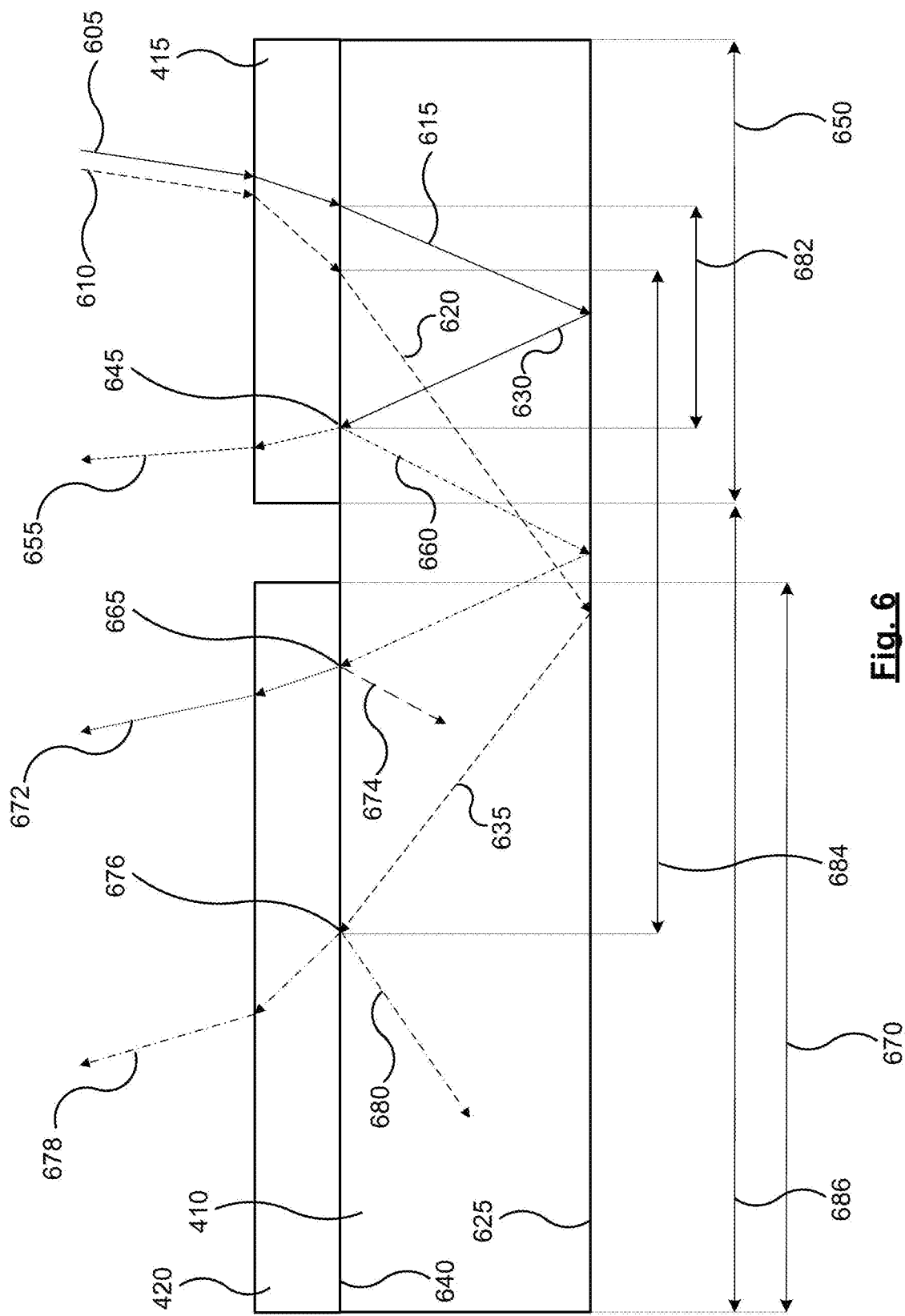
FIG. 6 shows a schematic, cross-sectional representation of the display optic shown in FIG. 4.

Furthermore, in some example WHUDs, one display optic may be used to handle multiple colors of output light to form a color image. As discussed above, the optical performance of the display optic may be color-dependent. As such, image non-uniformities may also be caused by color-dependent variations in optical losses in the display optic. These losses may contribute to non-uniformities in images formed using the display optic. FIG. 6 shows a schematic, cross-sectional representation of the display optic shown in FIG. 4. Similar to FIG. 5, FIG. 6 also shows the light guide, the incoupler, and the outcoupler as being planar (i.e. without their curvature as depicted in FIG. 4) for ease of illustration.

FIG. 6 shows input light beams 605 and 610 being incident upon incoupler 415. In some examples, beams 605 and 610 may be directed onto incoupler 415 by spatial modulator 220, as shown in FIG. 5. Beams 605 and 610 may have different wavelengths (i.e. different colors). While FIG. 6 shows beams 605 and 610 as being spaced from one another, it is contemplated that in some examples beams 605 and 610 may be coincident. In other words, in some examples beams 605 and 610 may be part of a single, multi-color output light beam.

Incoupler 415 may direct at least a portion of beams 605 and 610 into light guide 410 to form incoupled beams 615 and 620 respectively. Due to the difference in their wavelengths, incoupler 415 may direct beams 615 and 620 into light guide 410 at different angles. Beams 615 and 620 may be internally reflected by an inner surface 625 of light guide 410 to form a first reflected light beam 630 and a second reflective light beam 635 respectively. Light beams may also be referred to as "beams", in short.

Reflected light beam 630 is incident upon another internal surface 640 of light guide 410 at bounce position 645. Surface 640 may be at least partially internally reflective based on the angle of incidence of light beams upon it. Since incidence position 645 is within the length 650 of incoupler 415 (i.e. beam 630 is incident upon incoupler 415), beam 630 may be described as being incident upon a reflective surface of incoupler 415. In other words, reflected beam 630 may be described as being incident upon a reflective surface of incoupler 415 at bounce position 645.

As reflected beam 630 is incident upon a reflective surface of incoupler 415 at bounce position 645, reflected beam 630 may be partially outcoupled from light guide 410 by incoupler 415 to form lost beam 655. Lost beam 655 is described as "lost" since beam 655 leaves the display optic before it can reach outcoupler 420 and be directed towards the eye of the user to contribute to forming an image. Lost beam 655 may also be described as a lost portion of beam 605. Another portion of reflected beam 630 may be internally reflected back into light guide 410 to form reflected beam 660 which continues propagating in light guide 410 towards outcoupler 420. As lost beam 655 does not reach outcoupler 420 to be directed to an eye of a user, lost beam 655 represents an incoupling loss associated with beam 605.

Reflected beam 660 reflects from surface 625 and becomes incident upon surface 640 at incidence position 665, which is within the length 670 of outcoupler 420. In other words, at incidence position 665, beam 660 is incident upon outcoupler 420. A portion of beam 660 is outcoupled by outcoupler 420 to form beam 672 directed towards the eye of the user to form an image. Another portion of beam 660 may be internally reflected back into light guide 410 to form beam 674, which in turn propagates along light guide 410.

Reflected beam 635, in turn, propagates towards and becomes incident upon surface 640 at a second bounce position 676. Bounce position 676 is outside of length 650 of incoupler 415. Moreover, bounce position 676 may be described as being on a reflective surface 640 within a length 686 of light guide 410. Bounce position 676 is also within a length 670 of outcoupler 420. In other words, at bounce position 676 beam 635 is incident upon outcoupler 420.

At bounce position 676 a portion of beam 635 is outcoupled by outcoupler 420 to form a beam 678 directed towards the eye of the user to form an image. Another portion of beam 635 may be internally reflected back into light guide 410 to form beam 680. As the bounce position 676 of reflected beam 635 is outside of length 650 of incoupler 415, beam 635 does not experience an incoupling loss caused by incoupler 415 outcoupling a portion of beam 635 out of light guide 410.

In other words, the extent of incoupling losses of a given beam may be at least partly based on a bounce length, and the corresponding bounce position, of that beam within the light guide. The bounce length, in turn, may be based on the angle at which the beam is directed into the light guide by the incoupler. This angle, in turn, may be a function of the wavelength of the beam. FIG. 6 shows a bounce length 682 associated with beam 605 and a bounce length 684 associated with beam 610. Bounce length 684 is longer than bounce length 682. The longer bounce length of beam 610 may allow it to avoid a bounce position within the length 650 of incoupler 415, thereby allowing beam 610 to avoid incoupling losses caused by incoupler 415 outcoupling a portion of beam 610 (or its associated beam 620) out of light guide 410.

In some examples, beams of a longer wavelength may have correspondingly longer bounce lengths, and beams of a shorter wavelength may have relatively shorter bounce lengths. As such, the use of the display optic shown in FIGS. 4-6 to handle beams of multiple wavelengths may cause wavelength-dependent incoupling losses, which may in turn cause color balance and intensity non-uniformities in the image formed using the display optic.

Figure 7:
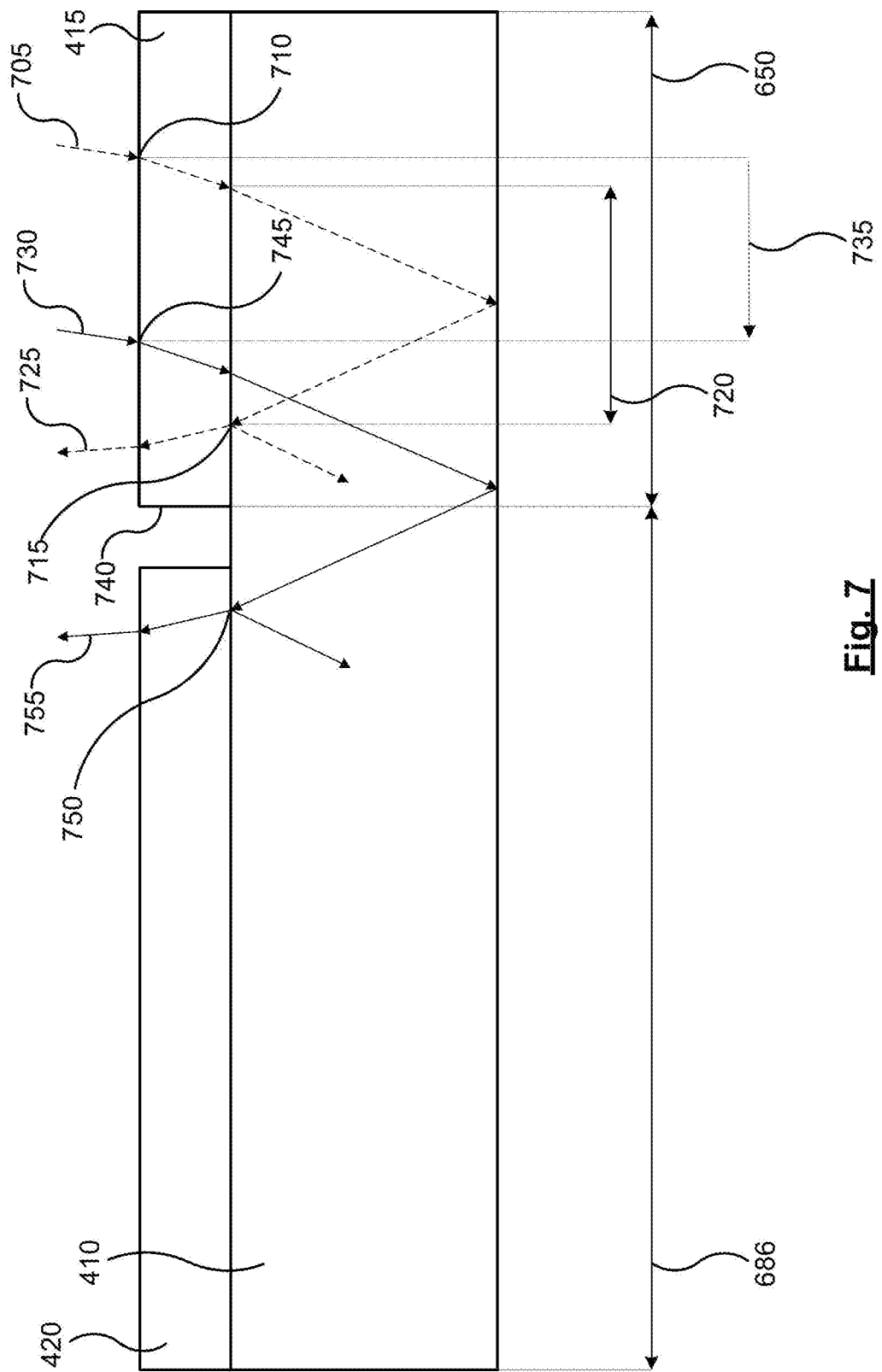
FIG. 7 shows a schematic representation of the display optic of FIG. 6, in accordance with a non-limiting implementation of the present specification.

These non-uniformities may be reduced or counteracted by adjusting a beam characteristic of the beams incident upon the incoupler to control or reduce the differences between the incoupling losses associated with those beams. Some examples of such adjustments are described in relation to FIGS. 7-9. FIG. 7 shows the display optic shown in FIG. 6, with a beam 705 of light incident upon incoupler 415 at an incidence position 710. The optical path of beam 705 through the display optic may be similar to the optical path of beam 605 as shown in FIG. 6.

Beam 705 may be directed into light guide 410, and then reflected by light guide 410 to become incident upon incoupler 415 at a bounce position 715. Beam 705 may have a bounce length 720. Both the bounce position 715 and bounce length 720 of beam 705 may be dependent on the wavelength of beam 705. As shown in FIG. 7, when beam 705 is incident upon incoupler 415 at incidence position 710, bounce length 720 of beam 705 causes bounce position 715 to be within length 650 of incoupler 415. At bounce position 715, incoupler 415 may outcouple a portion of beam 705 out of light guide 410 to form a lost portion 725. Lost portion 725 may represent an incoupling loss of beam 705.

In order to reduce or avoid the incoupling loss caused by bounce position 715 being within length 650 of incoupler 415, the incidence position of beam 705 may be moved relative to incoupler 415. FIG. 7 shows a beam 730 which is similar to beam 705, but is moved or displaced relative to incoupler 415. An arrow 735 shows the displacement of beam 730 relative to beam 705. Beam 705 may also be described as having been displaced relative to an edge 740 of incoupler 415. Edge 740 may represent the downstream edge of incoupler 415 relative to the direction of propagation of beams 705 and 730 in light guide 410 or the display optic. Edge 740 may also define the boundary between length 650 of incoupler 415 and length 686 of light guide 410.

In FIG. 7 beam 705 is shown in dashed lines to signify that beam 705 is moved along arrow 735 to form beam 730. Beam 730 has an incidence position 745 on incoupler 415, which incidence position 745 is closer to edge 740 than incidence position 710 is to edge 740. Beam 730 has the same bounce length as bounce length 720 of beam 705. As such, moving the incidence position from incidence position 710 to incidence position 745 moves a bounce position 750 of beam 730 outside of length 650 of incoupler 415 and within length 686 of light guide 410. In other words, moving the incidence position from incidence position 710 to incidence position 745 moves a bounce position out of the reflective surface of the incoupler and onto the reflective surface of the light guide. At bounce position 750, outcoupler 420 may outcouple a portion of beam 730 to form beam 755 propagating towards an eye of a user to form an image.

As beam 730 is not incident upon incoupler 415 at bounce position 750, beam 730 is not subject to outcoupling losses caused by incoupler 415 outcoupling a portion of beam 730 out of light guide 410. As such, incoupling losses due to the bounce position being within the length of the incoupler may be reduced or eliminated by moving the incidence position of the beam relative to the incoupler closer to the downstream edge of the incoupler. In other words, a beam's incoupling loss may be higher if the location of the beam's bounce position is within the incoupler and lower if the location of the bounce position is within the light guide.

While FIG. 7 shows moving or displacing one beam, it is contemplated that in some examples multiple beams having different corresponding wavelengths may be moved relative to the incoupler in a manner similar to that described in relation to FIG. 7. As beams with shorter wavelengths tend to have shorter bounce lengths, in some examples the beams with shorter wavelengths may be moved closer to the downstream edge of the incoupler relative to the beams with longer wavelengths.

Moreover, in some examples, the beams with different wavelengths may be moved relative to the incoupler such that the distance of the incidence position of each beam on the incoupler from the downstream edge of the incoupler is in proportion to the wavelength of the corresponding beam. In other words, beams with a shorter wavelength may be moved closer to the downstream edge in proportion to their wavelength compared to beams with longer wavelengths.

In other words, in some examples, the first beam and the second beam may be incident upon the reflective surface of the incoupler at a first incidence position and a second incidence position respectively. The reflective surface of the incoupler may have an edge. In some examples, this edge may comprise the downstream edge of the incoupler. Moreover, in some examples, the edge may be disposed between the first incidence position and the first bounce position. The adjusting the beam characteristic may comprise adjusting at least one of the first incidence position and the second incidence position relative to the edge.

Furthermore, in some examples, a first given incidence position may be one of the first incidence position and the second incidence position corresponding to a shorter one of the first wavelength and the second wavelength. A second given incidence position may be another one of the first incidence position and the second incidence position corresponding to a longer one of the first wavelength and the second wavelength. Adjusting at least one of the first incidence position and the second incidence position relative to the edge may comprise adjusting at least one of the first incidence position and the second incidence position to position the first given incidence position to be closer to the edge than the second given incidence position is to the edge.

In addition, in some examples adjusting at least one of the first incidence position and the second incidence position relative to the edge may comprise adjusting at least one of the first incidence position and the second incidence position relative to the edge to set a first ratio of a first distance of the first incidence position from the edge to a second distance of the second incidence position from the edge to be about equal to a second ratio of the first wavelength to the second wavelength.

Figure 8:
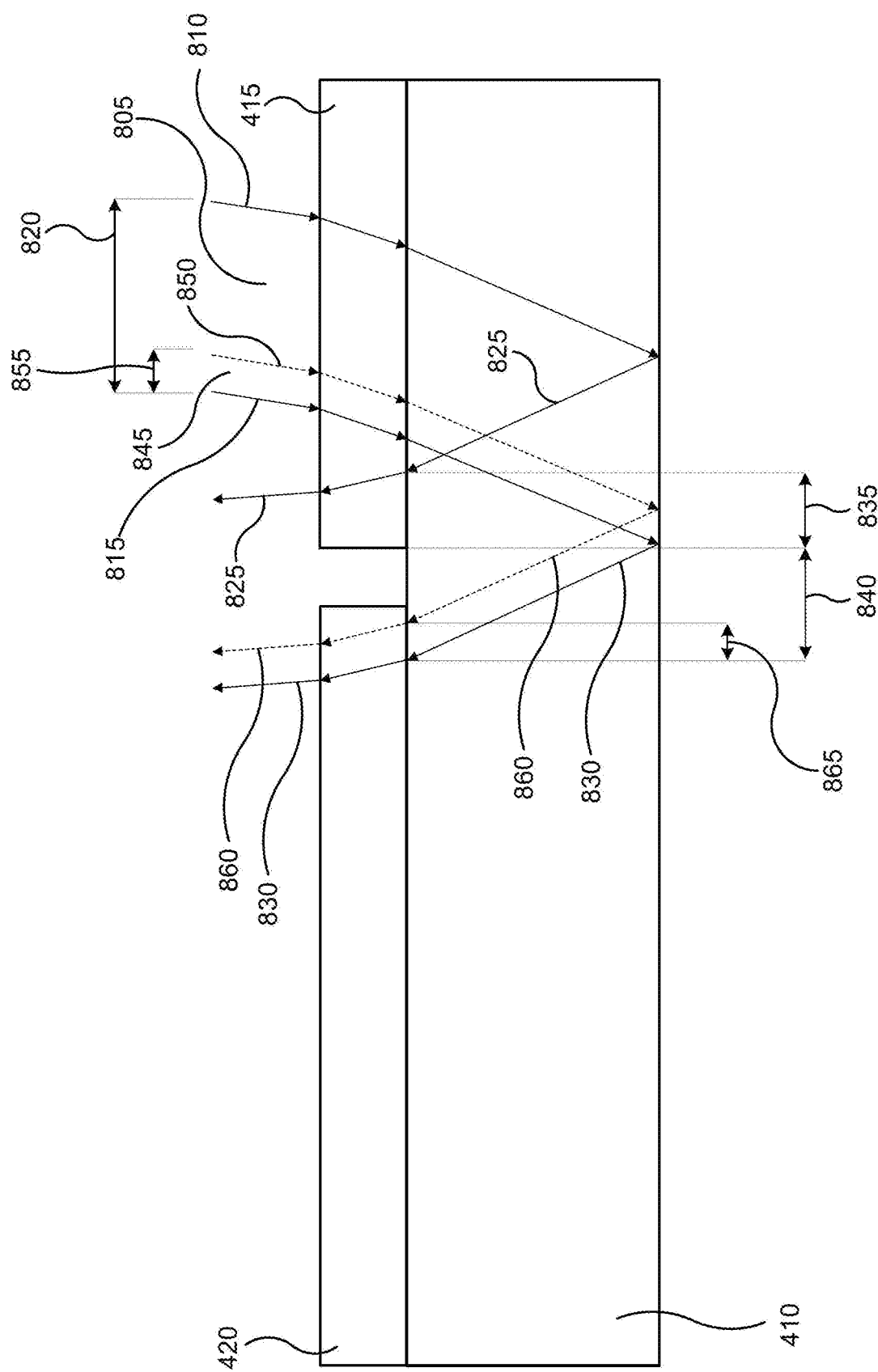
FIG. 8 shows a schematic representation of the display optic of FIG. 7, in accordance with a non-limiting implementation of the present specification.

While FIGS. 6 and 7 represent beams as lines for clarity of illustration, in operation beams of light have a measurable width. In addition to adjusting the beam incidence position to adjust incoupling losses, in some examples beam width may also be adjusted to adjust or control incoupling losses. FIG. 8 shows the display optic of FIG. 7. FIG. 8 shows a beam 805 of light incident upon incoupler 415. Beam 805 is defined by outer boundaries 810 and 815, and has a width 820.

Beam 805 is reflected by light guide 410 to form a reflected beam defined by outer boundaries 825 and 830. A first portion 835 of the width of this reflected beam is incident upon incoupler 415. Incoupler 415, in turn, may outcouple some or all of this first portion 835 out of light guide 410, thereby contributing to formation of lost beams and incoupling losses associated with beam 805. A second portion 840 of the width of the reflected beam is not incident upon incoupler 415, and is not subject to incoupling losses caused by incoupler 415.

In order to reduce or eliminate the portion 835 of beam 805 that, upon being reflected by light guide 410, is incident upon incoupler 415, width 820 of beam 805 may be reduced to form a narrower beam 845. Beam 845 is defined by outer boundaries 850 and 815, and has a width 855. Width 855 of beam 845 is smaller than width 820 of beam 805. Beam 845 may be reflected by light guide 410 to form a reflected beam defined by outer boundaries 860 and 830. As shown in FIG. 8, the width 865 of this reflected beam is incident upon outcoupler 420 and is outside the length of incoupler 415. As such, by reducing the width of beam 805 to form beam 845, bounce positions on incoupler 415 may be eliminated, thereby eliminating incoupling losses caused by incoupler 415 outcoupling reflected beams out of light guide 410.

In some examples, the minimum beam width needed for a beam to be able to form an image of a given resolution may be proportional to the wavelength of the beam. In other words, a longer wavelength beam may have a larger minimum width to achieve a given resolution compared to a shorter wavelength beam. For example, when red, green, and blue beams are used to form a color image of a given resolution, the red beam may have a larger minimum width than the green beam, which green beam in turn may have a larger minimum width than the blue beam.

As such, in some examples, to reduce incoupling losses, the shorter wavelength beams incident on the incoupler may be narrowed (i.e. have their width reduced) more than the longer wavelength beams. In some examples, this differential narrowing may be in proportion to the wavelengths of the beams, with the shorter wavelength beams narrowed more than the longer wavelength beams.

Moreover, while FIG. 8 shows one beam being narrowed, it is contemplated that in some examples multiple beams of different wavelengths may be incident on the incoupler and used to form a color image. In some examples, a subset of the beams incident on the incoupler may be narrowed to adjust or reduce their incoupling losses. For example, since shorter wavelength beams have a shorter bounce length and are more susceptible to incoupling losses caused by the incoupler, in some examples a subset of the shorter wavelength beams may be narrowed while a subset of the longer wavelength beams may be narrowed relatively less or not narrowed.

In other words, in some examples, the beam characteristic may comprise the beam width. In examples where two beams are incident on the incoupler, adjusting the beam characteristic may comprise adjusting the beam width of at least one of the first beam and the second beam. Moreover, in some examples, adjusting the beam width of at least one of the first beam and the second beam may comprise adjusting the beam width of at least one of the first beam and the second beam to set a first ratio of the beam width of the first beam to a beam width of the second beam to be about equal to a second ratio of the first wavelength to the second wavelength.

Figure 9:
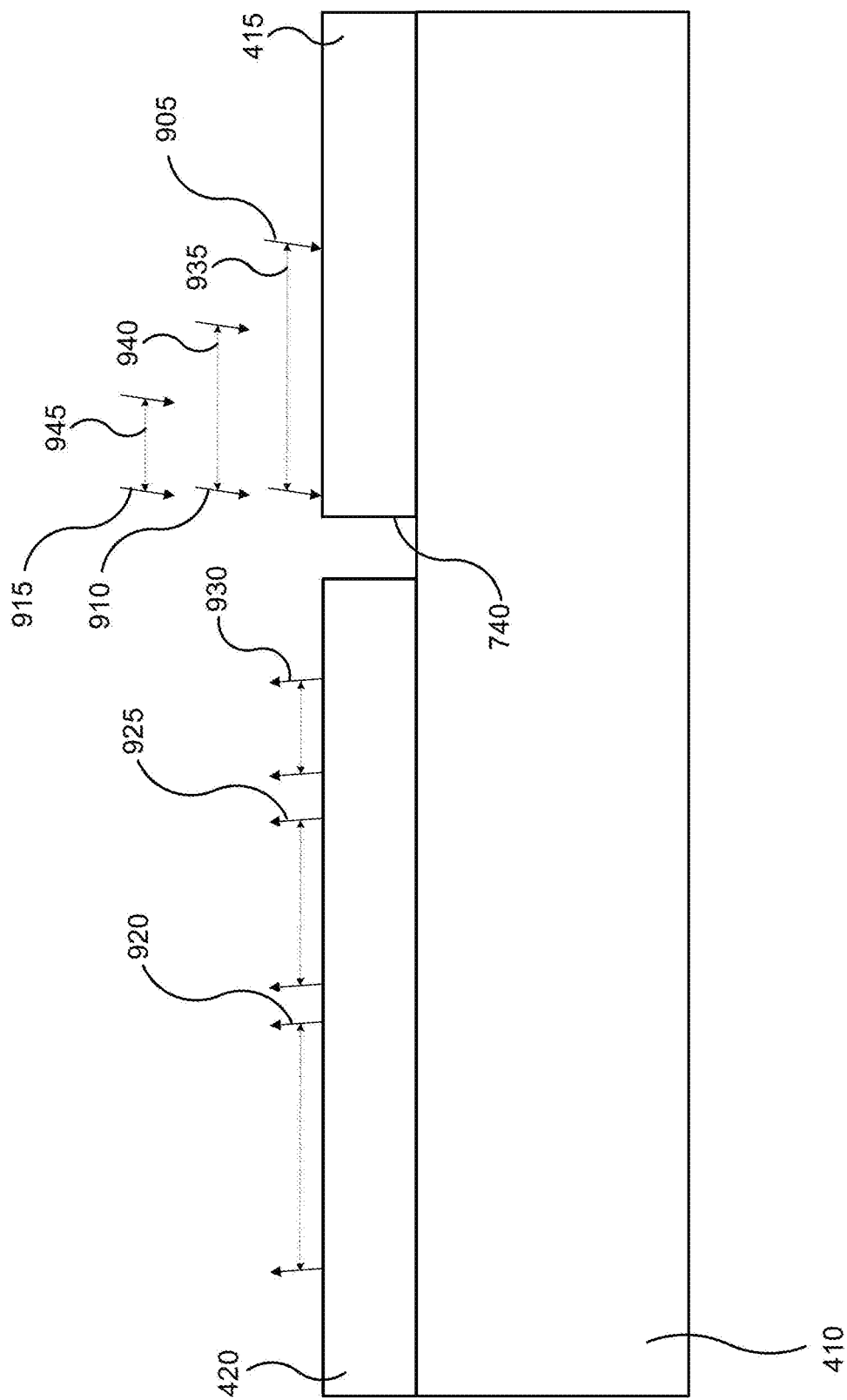
FIG. 9 shows a schematic representation of the display optic of FIG. 8, in accordance with a non-limiting implementation of the present specification.

Turning now to FIG. 9, a representation is shown of the display optic of FIG. 8. FIG. 9 shows three beams 905, 910, and 915 incident upon incoupler 415. Beams 905, 910, and 915 may have different wavelengths or colors. In some examples, beams 905, 910, and 915 may be red, green, and blue respectively. Beams 905, 910, and 915 may be directed into light guide 410 by incoupler 415, reflected by light guide 410 towards outcoupler 420, and then outcoupled by outcoupler 420 to form beams 920, 925, and 930 respectively.

Beam 905, having the longest wavelength and the corresponding longest bounce length, may be outcoupled furthest downstream as beam 920. Similarly, beam 915, having the shortest wavelength and the correspondingly shortest bounce length, may be outcoupled furthest upstream as beam 930. Upstream and downstream may be defined in relation to the direction of propagation of light beams in the light guide.

To control the differences between the incoupling losses of beams 905, 910, and 915, characteristics of these beams may be adjusted. Examples of such characteristics may include the beams' widths, their incidence positions on incoupler 415, and the like. To reduce the likelihood of beams 905, 910, and 915 generating corresponding reflected beams having bounce positions along the length of incoupler 415, beams 905, 910, and 915 may be positioned close to edge 740 of incoupler 415. In some examples, a space or gap may be left between the downstream edge of the beams and edge 740 to reduce the likelihood of optical edge effects at edge 740 distorting beams 905, 910, and 915.

Beams 905, 910, and 915 may have widths 935, 940, and 945 respectively. In some examples, widths 935, 940, and 945 may be adjusted in proportion to the wavelengths of beams 905, 910, and 915 to reduce or eliminate portions of reflected beams 905, 910, and 915 that may be subject to incoupling losses caused by incoupler 415. As such, beam 905 which has the longest wavelength may be adjusted to have the largest width 935. Similarly, beam 915, which has the shortest wavelength may be adjusted to have the smallest width 945. It is also contemplated that in some examples, the incidence positions and beam widths of beams 905, 910, and 915 may be different than those shown in FIG. 9.

As shown in FIGS. 8 and 9, the beams passing through the display optic have widths. In relation to such beams, in some examples "incident position" may refer to the position of the center of the beam (i.e. the midpoint between the outer boundaries of the beam), the position of the downstream or upstream outer boundary of the beam, the center of intensity of the beam, and the like.

In addition, in some examples the methods of controlling the beam characteristics described herein may be used to reduce the differences between the incoupling losses of the different beams used to form an image. As discussed above, in some examples these incoupling losses may be caused by the differences in the wavelength or the incidence position of the beams on the incoupler, which incoupling losses may cause intensity or color balance non-uniformities in the images formed using the beams. Reducing the differences in the incoupling losses of the different beams may reduce these intensity or color balance non-uniformities. Moreover, in some examples the characteristics of the beams may be adjusted in order to reduce the incoupling loss associated with each of the beams, in addition to or instead of adjusting the characteristics to reduce the differences between the incoupling losses of the beams.

Referring back to FIG. 5, in some examples the differences in the incoupling losses may be caused by the field position-dependent differences in the incidence positions or angles of the beams relative to incoupler 415. In such examples, beam characteristics may be adjusted to reduce or equalize the field position-dependent incoupling losses, to reduce field position-dependent intensity or color balance non-uniformities in the image formed using the display optics described herein.

In other words, a field position may be obtained, which field position may comprise spatial coordinates of a pixel of an image to be formed using the first beam and the second beam. The beam characteristic of at least one of the first beam and the second beam may then be adjusted based on the field position. Adjusting the beam characteristic may in turn reduce an intensity non-uniformity in the image, which intensity non-uniformity may be caused by changes in the first incoupling loss and the second incoupling loss as a function of the field position.

Moreover, in some examples adjusting the beam characteristic of at least one of the first beam and the second beam based on the field position may comprise adjusting an intensity of at least one of the first beam and the second beam based on the field position. In some examples, the beam intensities may be adjusted by controlling light source 210 or the relay optic comprising spatial modulator 220. In addition, in some examples, the beam intensities may be adjusted by introducing a neutral-density filter with a transmittance that varies as a function of the field positions. In some examples, the beams may also be adjusted using at least one aspheric lens that varies beam size as a function of the field position.

Furthermore, in some examples, adjusting the beam characteristic of at least one of the first beam and the second beam based on the field position may comprise adjusting a beam width of at least one of the first beam and the second beam based on the field position. In some examples, the beam width may be adjusted using the relay optic or other passive or active optical elements positioned in the optical path of the light beams from the light source to the display optic.

In addition, in some examples, adjusting the beam characteristic of at least one of the first beam and the second beam based on the field position may comprise adjusting a polarization of at least one of the first beam and the second beam based on the field position. In some examples, beam polarization may be adjusted using polarization-based filters, and the like. Moreover, in some examples, adjusting the polarization may allow for polarization-based adjustments of intensity, such as using polarization based filters and the like.

Referring to FIGS. 2-4, in some examples an example WHUD may have the features or perform the functions described herein in relation to method 100 and the other methods described herein. The WHUD may comprise light source 210 to generate output light 215 comprising a first beam having a first wavelength and a second beam having a second wavelength. The WHUD may also comprise a relay optic to receive output light 215 from light source 210. In some examples, the relay optic may comprise spatial modulator 220. Moreover, in some examples, the relay optic may comprise active or passive optical elements other than the spatial modulator. In addition, the WHUD may comprise light guide 410, and incoupler 415 carried by light guide 410.

Incoupler 415 may receive output light 215 from the relay optic and direct at least a portion of the first beam and at least a portion of the second beam into light guide 410. Light guide 410, in turn, may internally reflect the portion of the first beam and the portion of the second beam to form a first reflected beam and a second reflected beam respectively. The first reflected beam may be incident upon a reflective surface of at least one of incoupler 415 and light guide 410 at a first bounce position, and the second reflected beam may be incident upon the reflective surface of at least one of incoupler 415 and light guide 410 at a second bounce position. The first beam may have a first incoupling loss based on the first bounce position, and the second beam may have a second incoupling loss based on the second bounce position.

The WHUD may also comprise outcoupler 420 carried by light guide 410. Outcoupler 420 may direct at least a portion of the first reflected beam and at least a portion of the second reflected beam out of light guide 410 towards an eye of a user wearing the WHUD. In addition, the WHUD may comprise controller 230 in communication with light source 210 and the relay optic. Controller 230 may control light source 210 to emit output light 215. Controller 230 may also control at least one of light source 210 and the relay optic to adjust a beam characteristic of at least one of the first beam and the second beam to control a difference between the first incoupling loss and the second incoupling loss.

In some examples, the beam characteristic comprises a beam width. To adjust the beam characteristic controller 230 may control at least one of light source 210 and the relay optic to adjust the beam width of at least one of the first beam and the second beam. Moreover, in some examples, to adjust the beam width of at least one of the first beam and the second beam controller 230 may control at last one of light source 210 and the relay optic to adjust the beam width of at least one of the first beam and the second beam to set a first ratio of the beam width of the first beam to a beam width of the second beam to be about equal to a second ratio of the first wavelength to the second wavelength.

Furthermore, in some examples, the first beam and the second beam may be incident upon the reflective surface of incoupler 415 at a first incidence position and a second incidence position respectively. The reflective surface of incoupler 415 may have an edge. In some examples, the edge may be disposed between the first incidence position and the first bounce position. To adjust the beam characteristic controller 230 may control at least one of light source 210 and the relay optic to adjust at least one of the first incidence position and the second incidence position relative to the edge.

In addition, in some examples, a first given incidence position may comprise one of the first incidence position and the second incidence position corresponding to a shorter one of the first wavelength and the second wavelength. A second given incidence position may comprise another one of the first incidence position and the second incidence position corresponding to a longer one of the first wavelength and the second wavelength. To adjust at least one of the first incidence position and the second incidence position relative to the edge controller 230 may control at least one of light source 210 and the relay optic to adjust at least one of the first incidence position and the second incidence position to position the first given incidence position to be closer to the edge than the second given incidence position is to the edge.

Moreover, in some examples, to adjust at least one of the first incidence position and the second incidence position relative to the edge controller 230 may control at least one of light source 210 and the relay optic to adjust at least one of the first incidence position and the second incidence position relative to the edge to set a first ratio of a first distance of the first incidence position from the edge to a second distance of the second incidence position from the edge to be about equal to a second ratio of the first wavelength to the second wavelength. As discussed above, it is contemplated that in some examples incoupler 415 may comprise a surface relief grating (SRG), and the like.

In some examples, controller 230 may also obtain a field position comprising spatial coordinates of a pixel of an image to be formed using the first beam and the second beam. Controller 230 may then control at least one of light source 210 and the relay optic to adjust the beam characteristic of at least one of the first beam and the second beam based on the field position. Controller 230 may adjust the beam characteristic to reduce an intensity non-uniformity in the image, which intensity non-uniformity may be caused by changes in the first incoupling loss and the second incoupling loss as a function of the field position.

Furthermore, in some examples, to adjust the beam characteristic of at least one of the first beam and the second beam based on the field position controller 230 may control at least one of light source 210 and the relay optic to adjust an intensity of at least one of the first beam and the second beam based on the field position. Moreover, in some examples, to adjust the beam characteristic of at least one of the first beam and the second beam based on the field position controller 230 may control at least one of light source 210 and the relay optic to adjust a beam width of at least one of the first beam and the second beam based on the field position.

In addition, in some examples, to adjust the beam characteristic of at least one of the first beam and the second beam based on the field position controller 230 may control at least one of light source 210 and the relay optic to adjust a polarization of at least one of the first beam and the second beam based on the field position.

It is contemplated that in some examples, the first incoupling loss may comprise a first lost portion of the first beam that is incident upon incoupler 415 and directed into light guide 410. The first lost portion may then be directed out of light guide 410 by incoupler 415. Similarly, the second incoupling loss may comprise a second lost portion of the second beam that is incident upon incoupler 415 and directed into light guide 410. The second portion may then be directed out of light guide 410 by incoupler 415.

In some examples, the first incoupling loss may be higher if a first location of the first bounce position is within incoupler 415 and lower if the first location of the first bounce position is within light guide 410. Similarly, the second incoupling loss may be higher if a second location of the second bounce position is within incoupler 415 and lower if the second location of the second bounce position is within light guide 410. In some examples, a bounce position being within the incoupler or the light guide may refer to the bounce position being within the length of the incoupler or the light guide respectively, as described for example in relation to FIGS. 6-8.

Moreover, as discussed above, it is contemplated that in some examples the relay optic may comprise a spatial modulator. For example, the relay optic may comprise spatial modulator 220, and the like. In addition, in some examples, the relay optic may further comprise at least one passive optical element to adjust the beam characteristic. Examples of passive optical elements include lenses, reflectors, filters, and the like.

In addition, in some examples where the WHUD forms color images, the light source may comprise a red light source, a green light source, and a blue light source. For example, the light source may comprise red, green, and blue lasers. In such examples, the controller may control at least one of the light source and the relay optic to adjust a beam characteristic of at least one of the red, green, and blue beams to control a difference between the respective incoupling losses of the red, green, and blue beams.

It is contemplated that method 100 and the other methods described herein may be performed by system 200, WHUD 300, and the other systems and devices described herein. It is also contemplated that method 100 and the other methods described herein may be performed by systems or devices other than the systems and devices described herein. In addition, it is contemplated that system 200, WHUD 300, and the other systems and devices described herein may have the features and perform the functions described herein in relation to method 100 and the other methods described herein. Moreover, system 200, WHUD 300, and the other systems and devices described herein may have features and perform functions other than those described herein in relation to method 100 and the other methods described herein.

Moreover, while FIG. 4 shows a given display optic having a given arrangement of light guide, incoupler, and outcoupler, it is contemplated that in some examples the display optic may have a different structure, and that the light guide, incoupler, and outcoupler may be arranged differently relative to one another. In addition, while some of the examples provided herein are described in the context of laser projectors and WHUDs, it is contemplated that the functions and methods described herein may be implemented in or by display systems or devices which may not use laser projectors or be WHUDs.

Throughout this specification and the appended claims, infinitive verb forms are often used. Examples include, without limitation: "to form," "to control," "to generate," "to emit," and the like. Unless the specific context requires otherwise, such infinitive verb forms are used in an open, inclusive sense, that is as "to, at least, form," to, at least, control," "to, at least, generate," and so on.

The above description of illustrated example implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. Moreover, the various example implementations described herein may be combined to provide further implementations.

In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of operating a wearable heads-up display ("WHUD"), wherein the WHUD comprises a light guide and an incoupler carried by the light guide, the method comprising:
    directing, by a relay optic, a first beam and a second beam towards the incoupler;
    directing, by the incoupler, at least a portion of the first beam and at least a portion of the second beam into the light guide;
    internally reflecting, by the light guide, the portion of the first beam and the portion of the second beam to form a first reflected beam and a second reflected beam respectively, the first reflected beam incident upon a reflective surface of at least one of the incoupler and the light guide at a first bounce position and the second reflected beam incident upon the reflective surface of at least one of the incoupler and the light guide at a second bounce position, the first beam having a first incoupling loss based on the first bounce position and the second beam having a second incoupling loss based on the second bounce position, the first incoupling loss comprising a first lost portion of the first beam that is directed out of the light guide by the incoupler, and the second incoupling loss comprising a second lost portion of the second beam that is directed out of the light guide by the incoupler; and
    adjusting a beam characteristic of at least one of the first beam and the second beam to control a difference between the first incoupling loss and the second incoupling loss.

2. The method of claim 1, wherein:
the first beam and the second beam are incident upon the reflective surface of the incoupler at a first incidence position and a second incidence position respectively;
the reflective surface of the incoupler has an edge disposed between the first incidence position and the first bounce position; and
the adjusting the beam characteristic comprises adjusting at least one of the first incidence position and the second incidence position relative to the edge.

3. The method of claim 2, wherein:
the first beam has a first wavelength and the second beam has a second wavelength;
a first given incidence position is one of the first incidence position and the second incidence position corresponding to a shorter one of the first wavelength and the second wavelength;
a second given incidence position is another one of the first incidence position and the second incidence position corresponding to a longer one of the first wavelength and the second wavelength; and
the adjusting at least one of the first incidence position and the second incidence position relative to the edge comprises adjusting at least one of the first incidence position and the second incidence position to position the first given incidence position to be closer to the edge than the second given incidence position is to the edge.

4. The method of claim 2, wherein:
the first beam has a first wavelength and the second beam has a second wavelength; and
the adjusting at least one of the first incidence position and the second incidence position relative to the edge comprises adjusting at least one of the first incidence position and the second incidence position relative to the edge to set a first ratio of a first distance of the first incidence position from the edge to a second distance of the second incidence position from the edge to be about equal to a second ratio of the first wavelength to the second wavelength.

5. The method of claim 1, further comprising:
obtaining a field position comprising spatial coordinates of a pixel of an image to be formed using the first beam and the second beam; and
adjusting the beam characteristic of at least one of the first beam and the second beam based on the field position, the adjusting the beam characteristic to reduce an intensity non-uniformity in the image, the intensity non-uniformity caused by changes in the first incoupling loss and the second incoupling loss as a function of the field position.

6. The method of claim 5, wherein:
the adjusting the beam characteristic of at least one of the first beam and the second beam based on the field position comprises, for at least one of the first beam and the second beam and based on the field position, adjusting at least one of a beam width, an intensity, and/or a polarization.

7. The method of claim 1, wherein:
the first incoupling loss is higher if a first location of the first bounce position is within the incoupler and lower if the first location of the first bounce position is within the light guide; and the second incoupling loss is higher if a second location of the second bounce position is within the incoupler and lower if the second location of the second bounce position is within the light guide.

8. The method of claim 1, wherein:
the WHUD comprises a light source; and
the method further comprises emitting, by the light source, the first beam and the second beam.

9. A method of operating a wearable heads-up display ("WHUD"), wherein the WHUD comprises a light guide and an incoupler carried by the light guide, the method comprising:
directing, by a relay optic, a first beam and a second beam towards the incoupler;
directing, by the incoupler, at least a portion of the first beam and at least a portion of the second beam into the light guide;
internally reflecting, by the light guide, the portion of the first beam and the portion of the second beam to form a first reflected beam and a second reflected beam respectively, the first reflected beam incident upon a reflective surface of at least one of the incoupler and the light guide at a first bounce position and the second reflected beam incident upon the reflective surface of at least one of the incoupler and the light guide at a second bounce position, the first beam having a first incoupling loss based on the first bounce position and the second beam having a second incoupling loss based on the second bounce position; and
adjusting a beam width of at least one of the first beam and the second beam to control a difference between the first incoupling loss and the second incoupling loss.

10. The method of claim 9, wherein:
the first beam has a first wavelength and the second beam has a second wavelength; and
the adjusting the beam width of at least one of the first beam and the second beam comprises adjusting the beam width of at least one of the first beam and the second beam to set a first ratio of the beam width of the first beam to a beam width of the second beam to be about equal to a second ratio of the first wavelength to the second wavelength.

11. A wearable heads-up display (WHUD) comprising:
a light source to generate an output light comprising a first beam and a second beam;
a relay optic to receive the output light from the light source;
a light guide;
an incoupler carried by the light guide, the incoupler to receive the output light from the relay optic and direct at least a portion of the first beam and at least a portion of the second beam into the light guide, the light guide to internally reflect the portion of the first beam and the portion of the second beam to form a first reflected beam and a second reflected beam respectively, the first reflected beam incident upon a reflective surface of at least one of the incoupler and the light guide at a first bounce position and the second reflected beam incident upon the reflective surface of at least one of the incoupler and the light guide at a second bounce position, the first beam having a first incoupling loss based on the first bounce position and the second beam having a second incoupling loss based on the second bounce position, wherein the first incoupling loss comprises a first lost portion of the first beam that is directed out of the light guide by the incoupler, and wherein the second incoupling loss comprises a second lost portion of the second beam that is directed out of the light guide by the incoupler; and
a controller in communication with the light source and the relay optic, the controller to:
control at least one of the light source and the relay optic to adjust a beam characteristic of at least one of the first beam and the second beam to control a difference between the first incoupling loss and the second incoupling loss.

12. The WHUD of claim 11, wherein:
the beam characteristic comprises a beam width; and
to adjust the beam characteristic the controller is to control at least one of the light source and the relay optic to adjust the beam width of at least one of the first beam and the second beam.

13. The WHUD of claim 12, wherein:
the first beam has a first wavelength and the second beam has a second wavelength; and
to adjust the beam width of at least one of the first beam and the second beam the controller is to control at last one of the light source and relay optic to adjust the beam width of at least one of the first beam and the second beam to set a first ratio of the beam width of the first beam to a beam width of the second beam to be about equal to a second ratio of the first wavelength to the second wavelength.

14. The WHUD of claim 11, wherein:
the first beam and the second beam are incident upon the reflective surface of the incoupler at a first incidence position and a second incidence position respectively;
the reflective surface of the incoupler has an edge disposed between the first incidence position and the first bounce position; and
to adjust the beam characteristic the controller is to control at least one of the light source and the relay optic to adjust at least one of the first incidence position and the second incidence position relative to the edge.

15. The WHUD of claim 14, wherein:
the first beam has a first wavelength and the second beam has a second wavelength;
a first given incidence position is one of the first incidence position and the second incidence position corresponding to a shorter one of the first wavelength and the second wavelength;
a second given incidence position is another one of the first incidence position and the second incidence position corresponding to a longer one of the first wavelength and the second wavelength; and
to adjust at least one of the first incidence position and the second incidence position relative to the edge the controller is to control at least one of the light source and the relay optic to adjust at least one of the first incidence position and the second incidence position to position the first given incidence position to be closer to the edge than the second given incidence position is to the edge.

16. The WHUD of claim 14, wherein:
the first beam has a first wavelength and the second beam has a second wavelength; and
to adjust at least one of the first incidence position and the second incidence position relative to the edge the controller is to control at least one of the light source and the relay optic to adjust at least one of the first incidence position and the second incidence position relative to the edge to set a first ratio of a first distance of the first incidence position from the edge to a second distance of the second incidence position from the edge to be about equal to a second ratio of the first wavelength to the second wavelength.

17. The WHUD of claim 11, the controller is further to:
obtain a field position comprising spatial coordinates of a pixel of an image to be formed using the first beam and the second beam; and
control at least one of the light source and the relay optic to adjust the beam characteristic of at least one of the first beam and the second beam based on the field position, the controller to adjust the beam characteristic to reduce an intensity non-uniformity in the image, the intensity non-uniformity caused by changes in the first incoupling loss and the second incoupling loss as a function of the field position.

18. The WHUD of claim 17, wherein:
to adjust the beam characteristic of at least one of the first beam and the second beam based on the field position the controller is to control at least one of the light source and the relay optic to adjust at least one of: an intensity of at least one of the first beam and the second beam based on the field position; a beam width of at least one of the first beam and the second beam based on the field position; and/or a polarization of at least one of the first beam and the second beam based on the field position.

19. The WHUD of claim 11, wherein:
the first incoupling loss is higher if a first location of the first bounce position is within the incoupler and lower if the first location of the first bounce position is within the light guide; and
the second incoupling loss is higher if a second location of the second bounce position is within the incoupler and lower if the second location of the second bounce position is within the light guide.

* * * * *